(12) United States Patent
Lee et al.

(10) Patent No.: US 8,208,887 B2
(45) Date of Patent: Jun. 26, 2012

(54) RECEIVING CIRCUIT INCLUDING BALUN CIRCUIT AND NOTCH FILTER AND OPERATING METHOD THEREOF

(75) Inventors: Hee-Hyun Lee, Hwaseong-si (KR);
Yun-Young Choi, Seongnam-si (KR);
Jong-Won Choi, Seongnam-si (KR);
Hoon-Tae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 406 days.

(21) Appl. No.: 12/454,816

(22) Filed: May 22, 2009
(Under 37 CFR 1.47)

(65) Prior Publication Data

US 2010/0136942 A1 Jun. 3, 2010

(30) Foreign Application Priority Data

May 22, 2008 (KR) ........................ 10-2008-0047380

(51) Int. Cl.
*H04B 1/18* (2006.01)

(52) U.S. Cl. ......... 455/292; 455/307; 455/311; 455/340
(58) Field of Classification Search .................. 455/280,
455/292, 293, 296, 307, 311, 313, 338, 339,
455/340, 266
See application file for complete search history.

(56) References Cited

U.S. PATENT DOCUMENTS

| | | | | |
|---|---|---|---|---|
| 5,331,271 A * | 7/1994 | Thuis | ........................... | 323/355 |
| 6,850,746 B1 * | 2/2005 | Lloyd et al. | ................... | 455/272 |
| 7,825,746 B2 * | 11/2010 | Yeung et al. | .................. | 333/185 |
| 2006/0270377 A1 | 11/2006 | Bhatti et al. | | |
| 2008/0175307 A1 * | 7/2008 | Brunn et al. | .................. | 375/148 |

* cited by examiner

*Primary Examiner* — Nguyen Vo

(57) ABSTRACT

Provided are a receiving circuit including a balun circuit and a notch filter, and an operating method thereof. The receiving circuit includes a transformer, a notch filter, and a mixer. The transformer converts a single input signal to a differential input signal using a first tap. The notch filter blocks a specific frequency band of the single input signal by connecting a second tap with the first tap of the transformer using a condenser.

19 Claims, 7 Drawing Sheets

RECEIVING CIRCUIT INCLUDING BALUN CIRCUIT AND NOTCH FILTER AND OPERATING METHOD THEREOF

CROSS-REFERENCE TO RELATED APPLICATION(S) AND CLAIM OF PRIORITY

The present application is related to and claims the benefit under 35 U.S.C. §119 to an application filed in the Korean Intellectual Property Office on May 22, 2008 and assigned Serial No. 10-2008-0047380, the contents of which are incorporated hereby by reference.

TECHNICAL FIELD OF THE INVENTION

The present invention relates generally to a receiver and a method thereof in a wireless communication system, and in particular, to a receiving circuit where a balun circuit and a notch filter are realized inside a Radio Frequency (RF) chip, and an operating method thereof.

BACKGROUND OF THE INVENTION

Generally, a specific node of a wireless communication system that uses a Frequency Division Duplex (FDD) mode outputs a transmission signal of a transmitter with strongest power when a receiver is in a weak electric field in order to control power, so that the transmission signal outputs from the transmitter is flowed to the receiver and acts as an interference signal.

Accordingly, a conventional art provides methods for removing the transmission signal flowed to the receiver. For example, a technique for removing the transmission signal by inserting an external Surface Acoustic Wave (SAW) filter into the receiver is provided. The function of the SAW filter includes a function of removing a transmission (Tx) tone and a balun function of converting a single input signal input from an antenna into a differential input signal for driving a mixer. However, a technique using the SAW filter has inconvenience of having additional external parts.

For a conventional art of a balun circuit that is realized inside an RF chip, there exists a United States patent titled "Transformer-Based Multi-Band RF Front-End Architecture" (United States Publication No. 2006/0270,377, BroadCom Inc.)

The above US Publication No. 2006/0,270,377 relates to a transformer converting a single input signal into a differential input signal, and discloses a balun circuit generating differential signals of various bands using single input from an antenna through a multiple tap of the transformer. This structure performs only a function of converting one single input signal into a plurality of differential signals, and does not perform a notch function of a Tx band which is problematic in FDD.

As described above, the conventional art removes a Tx signal flowed to the inside of a receiver by inserting a SAW filter into the outside of an RF chip, and simultaneously, performs a balun function of converting a single signal input from an antenna into a differential signal for driving a mixer, but there is inconvenience of having additional external parts.

Therefore, a receiving circuit which performs a notch function as well as a balun function realized inside an RF chip using a transformer, and an operating method thereof are required.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide a receiving circuit including a balun circuit and a notch filter inside an RF chip, and an operating method thereof.

Another aspect of the present invention is to provide a receiving circuit including a balun circuit and a notch filter using a transformer inside an RF chip.

According to an aspect of the present invention, a receiving circuit including a balun circuit and a notch filter is provided. The receiving circuit includes: a transformer for converting a single input signal to a differential input signal using a first tap; a notch filter for blocking a specific frequency band of the single input signal by connecting a second tap with the first tap of the transformer using a condenser; and a mixer for outputting a signal of a desired frequency by mixing a differential input signal output via the first tap of the transformer with a local oscillation frequency.

According to another aspect of the present invention, a receiving circuit including a balun circuit and a notch filter is provided. The receiving circuit includes: a transformer for converting a single input signal to a differential input signal using a first tap; a notch filter for blocking a specific frequency band of the single input signal at a second tap using a mutual inductor characteristic of the transformer; and a mixer for outputting a signal of a necessary frequency by mixing a signal having an attenuated specific frequency band among differential input signals output via the first tap of the transformer with a local oscillation frequency.

According to still another aspect of the present invention, a receiving method of a receiver including a balun circuit and a notch filter is provided. The receiving method includes: estimating a Received Signal Strength Indication (RSSI) of a signal received via an antenna; determining a radio wave environment by comparing the estimated RSSI with a threshold; and switching between functions of the balun circuit and the notch filter depending on the determination result of the radio wave environment.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 7B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide a receiving circuit that has a balun circuit and a notch filter, and a receiving method thereof.

A technique of using a transformer instead of an inductor used for an output operation of a Low Noise Amplifier (LNA) at an RF end of a receiver, and simultaneously, performing a balun function by connecting a differential output signal of the transformer to a frequency mixer is widely used. Exemplary embodiments of the present invention realize a receiving circuit that includes a notch function as well as a balun function using a transformer inside an RF chip.

Figure 1A:
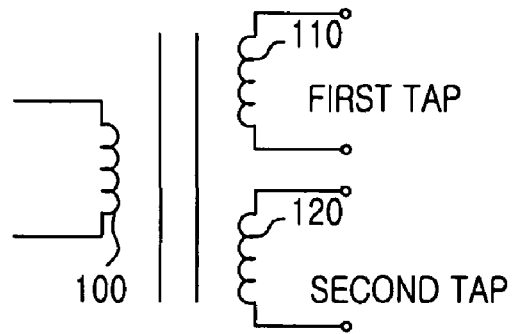
FIGS. 1A and 1B are illustrating a transformer having a balun function and a notch function according to an exemplary embodiment of the present invention.
Figure 1B:
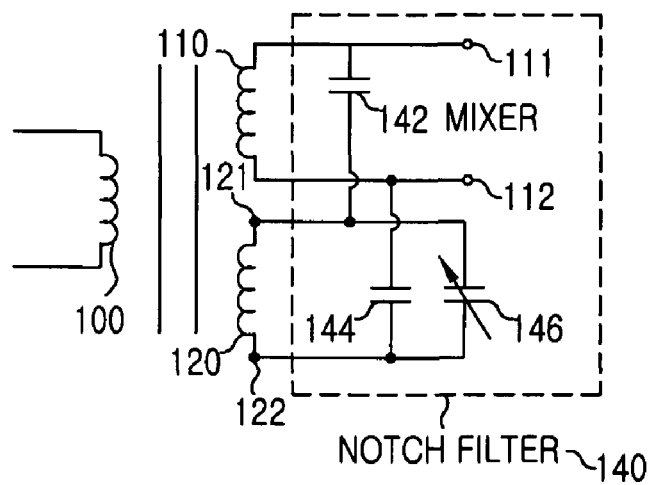

FIGS. 1A and 1B are illustrating a transformer having a balun function and a notch function according to an exemplary embodiment of the present invention.

Referring to FIG. 1A, the transformer is divided into an input part 100 of a first winding and output parts 110 and 120 of a second winding. The input part 100 and the output parts 110 and 120 are electrically isolated but magnetically coupled to each other. For example, when an AC current flows through the first winding 100, a magnetic flux passing through an iron core changes. Therefore, induced electromotive force by electromagnetic induction is generated to the second winding 110 and 120. At this point, the size of the induced electromotive force changes depending on the velocity at which the magnetic flux passing through the magnetic circuit changes, and the number of windings wound on both sides.

Referring to FIG. 1B, according to an exemplary embodiment of the present invention, two tap outputs 110 and 120 of the transformer are used. One output is output to a mixer, and the other output is used as a notch filter 140 for removing a Tx tone. For this purpose, the notch filter 140 forms a third degree notch filter by including unique inductors 110 and 120 of the transformer, coupling capacitors 142 and 144, and an additional control capacitor 146, and may cut a signal of a specific frequency. That is, a coupling capacitor 142 is connected between a node 111 of a first tap and a node 121 of a second tap. A coupling capacitor 144 is connected between a node 112 of the first tap and a node 122 of the second tap. Also, to control the frequency of the notch filter, a control capacitor 146 is connected between the node 121 and the node 122 of the second tap. The third degree notch filter may minimize a loss at a frequency to be passed, and maximize a loss at a frequency to be removed.

A balun function is described. A single-ended input signal of an input end 100 is converted into a differential input signal, and output to the first tap 110. At this point, since a transmission signal may be flowed to the single-ended input signal, the second tap 120 connected with the first tap using the coupling capacitor removes the transmission signal flowed to a receiver by performing a notch filter function.

Figure 2:
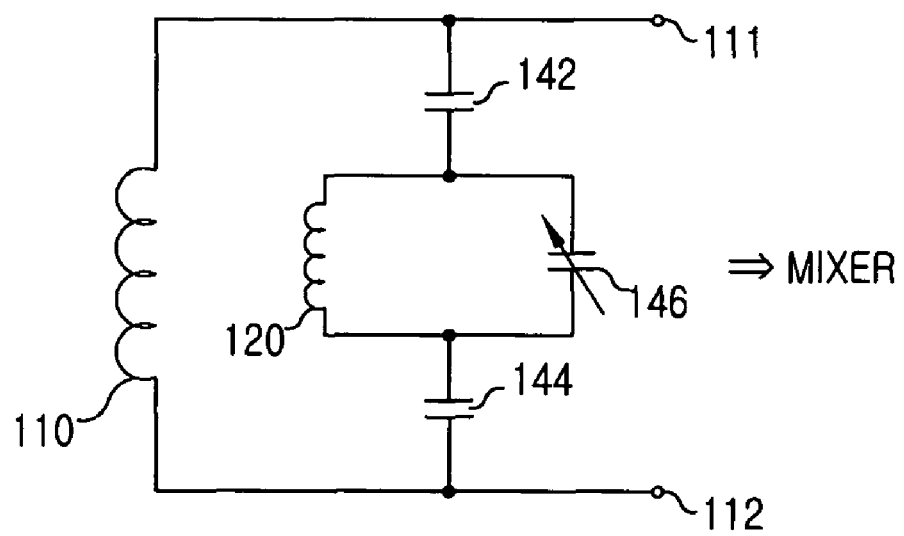
FIG. 2 is illustrating an equivalent circuit of FIG. 1B.

FIG. 2 illustrates an equivalent circuit which couples the notch filter and the mixer connection part described in FIG. 1B. Referring to FIG. 2, it is revealed that a third degree notch filter is symmetrically combined with a differential output signal. The frequency of the notch filter may be tuned by a control capacitor 146.

Figure 3:
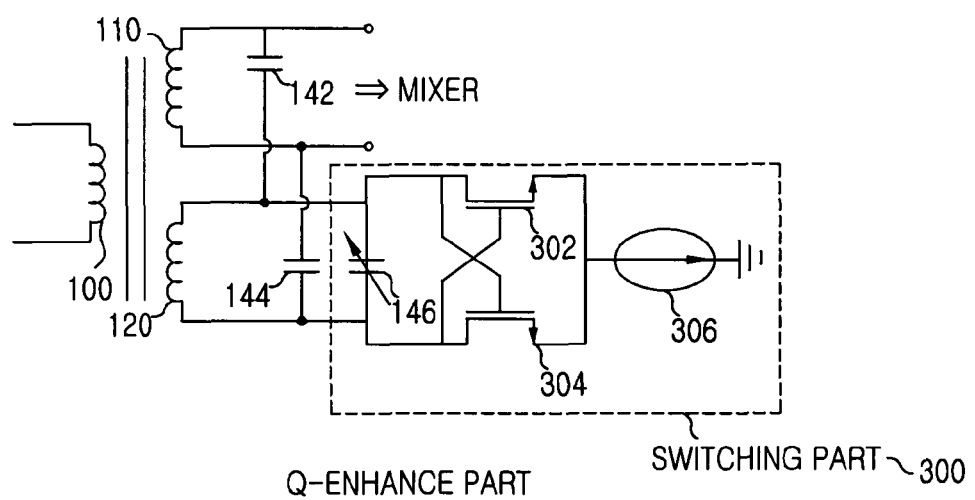
FIG. 3 is illustrating a transformer having a balun function and a notch function according to an exemplary embodiment of the present invention.

FIG. 3 illustrates a transformer having a balun function and a notch function according to an exemplary embodiment of the present invention.

Referring to FIG. 3, a Q value (sharpness of resonance) of an integrated inductor has a finite value, and a Q-enhancement part 300 for compensating for this is added, so that a loss by the transformer is compensated for, and simultaneously, a control capacitor 146 may be tuned inside a resonator. For example, a loss by the transformer is compensated for, and a notch filter function may be on/off-switched through tuning of the control capacitor 146. The Q-enhancement part 300 includes two transistors 302 and 304, and a current source 306, and has a structure of a differential amplifier.

Figure 4:
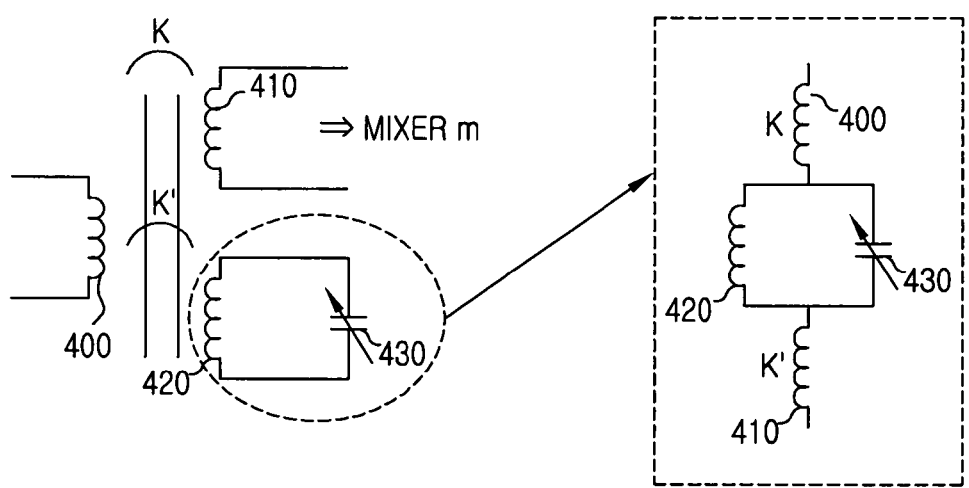
FIG. 4 is illustrating a transformer having a balun function and a notch function according to an exemplary embodiment of the present invention.

FIG. 4 illustrates a transformer having a balun function and a notch function according to an exemplary embodiment of the present invention.

Referring to FIG. 4, an actual transformer has a structure of providing mutual induction. When the mutual induction can be accurately estimated or known, a third degree notch filter may be formed using mutual inductors 400, 410, and 420 instead of capacitors used for coupling. The frequency of the notch filter may be tuned through values of a variable capacitor 430 and the mutual inductors 400, 410, and 420.

Figure 5:
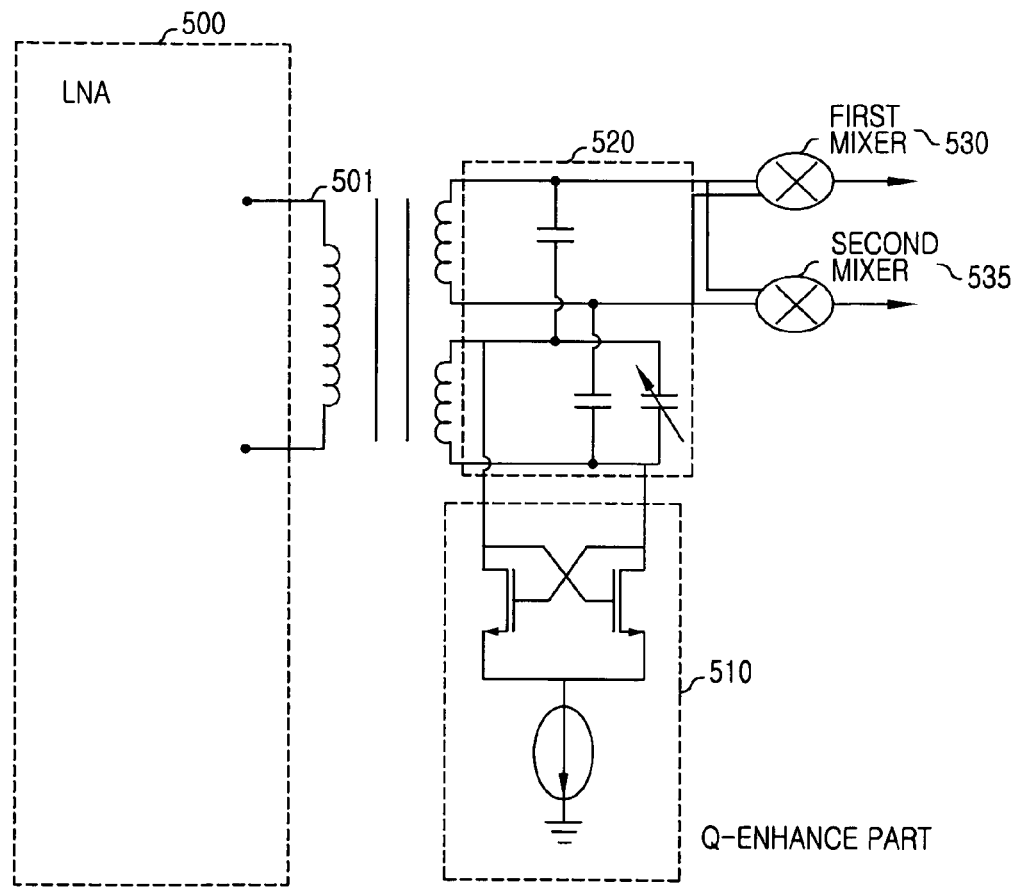
FIG. 5 is illustrating a receiving circuit including a balun circuit and a notch filter according to an exemplary embodiment of the present invention.

FIG. 5 illustrates a receiving circuit including a balun circuit and a notch filter according to an exemplary embodiment of the present invention.

Referring to FIG. 5, the receiving circuit includes a transformer having a balun function and a notch filter function 520, a common source single end main LNA amplifying part 500, and one or more mixers 530 and 535.

The LNA amplifier 500 is formed using a cascode amplifier (not shown) having a common source single end structure for main amplification of a single input signal input from an antenna. A circuit of a balun function and a notch filter function is formed to an output part 501 of a cascode amplifier structure (refer to FIGS. 1 to 3). Here, a Q-enhancement part 510 for controlling the frequency of a notch filter and a Q value is added.

Differential signals of the transformer are input to the first mixer 530 and the second mixer 535, respectively, mixed with a local oscillation frequency, and converted into an output signal of a desired frequency.

Figure 6:
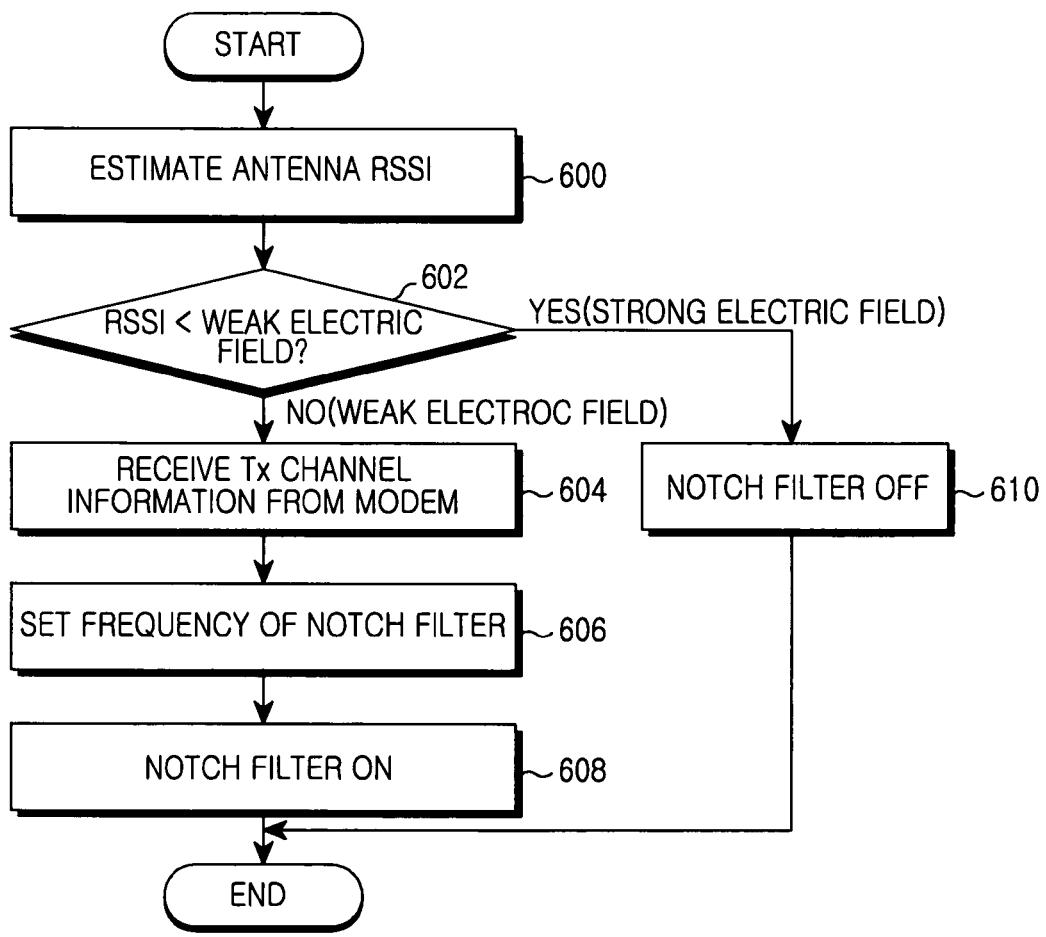
FIG. 6 illustrates a flowchart illustrating an operation of a receiver having a balun circuit and a notch filter according to an exemplary embodiment of the present invention.

FIG. 6 illustrates a flowchart illustrating an operation of a receiver having a balun circuit and a notch filter according to an exemplary embodiment of the present invention.

Referring to FIG. 6, in step 600, the receiver estimates a Received Signal Strength Indication (RSSI) of a signal received via an antenna.

In step 602, the receiver determines whether the estimated RSSI is a weak electric field or a strong electric field by comparing the estimated RSSI with a threshold. When the estimated RSSI is a strong electric field or a medium electric field, the receiver turns on the transformer and turns off the notch filter in step 610.

Alternatively, when the estimated RSSI is a weak electric field, the receiver receives transmission channel information from a modem in step 604, and sets the frequency of the notch filter using the transmission channel information in step 606. In step 608, the receiver turns on the transformer and turns on the notch filter.

Generally, since Tx leakage is not large in the vicinity of a strong electric field and a medium electric field, the receiver performs a transformer function by which a single output of the LNA 500 is connected to a differential output by operating the Q-enhancement part 510 of the notch filter, and during a weak electric field, receives transmission channel information at that moment from a modem, operates the Tx notch filter 510 by controlling a variable capacitor of the Q-enhancement part 510, and operates an entire receiver.

Thereafter, the operation procedure of the receiver according to an exemplary embodiment of the present invention is ended.

Figures 7A, 7B:
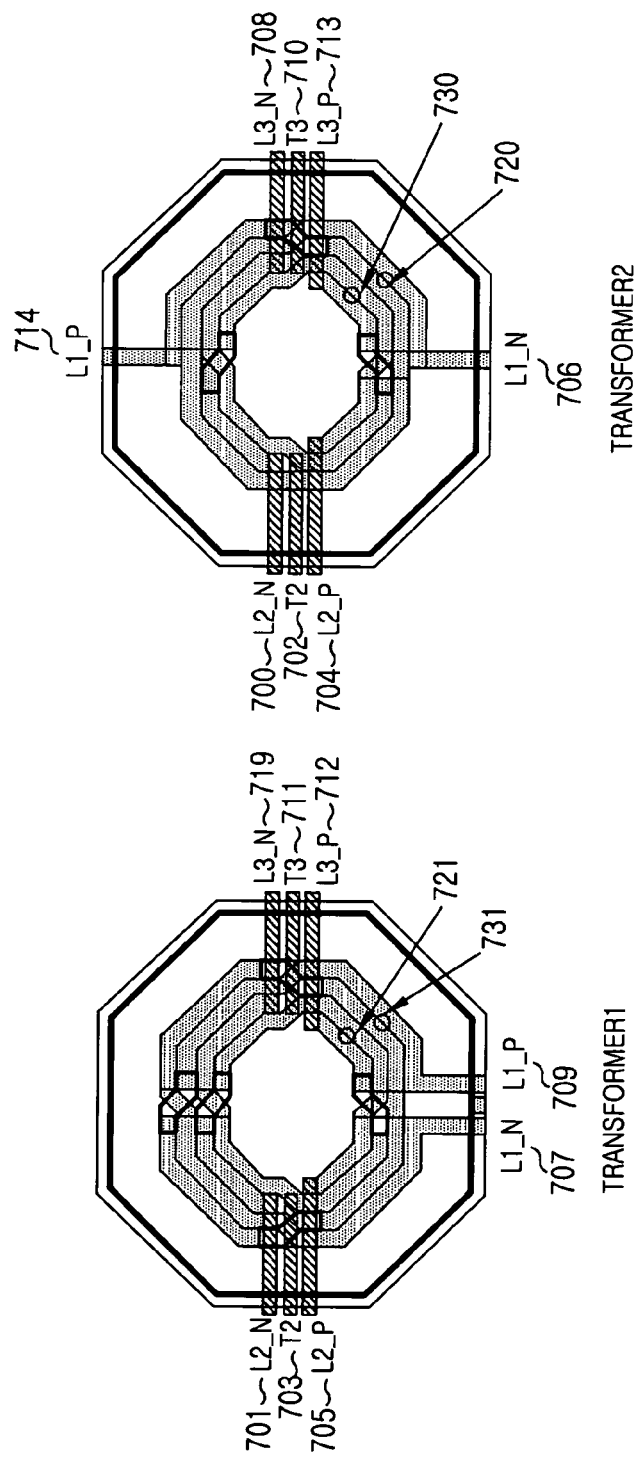
FIGS. 7A and 7B illustrate a layout of a transformer according to an exemplary embodiment of the present invention.

FIGS. 7A and 7B illustrate a layout of a transformer according to an exemplary embodiment of the present invention.

Referring to FIG. 7, terminals of a first inductor (first winding) are formed in one side (a) or vertically formed (b).

Terminals corresponding to a first side are L1_N 707, 706; L1_P 709, 714 and terminals L2_N 701, 700; L2_P 705, 704; L3_N 719, 708; and L3_P 712, 713 corresponding to inductors having taps are formed. Respective taps correspond to T2 703, 702 and T3 711, 710. The layout structure proposes a transformer structure where three inductors are included such that they do not overlap one another.

That is, first inductors 720 and 731 exist on the outer side of the transformer, second inductors and third inductors 721 and 730 are twisted in the inner side of the transformer such that they do not overlap each other. Also, the first, second, and third inductors are twisted such that they do not overlap one another.

As described above, a circuit performing a notch filter function and a balun circuit function is realized inside an RF chip, so that the number of external parts is reduced, and an interface circuit may be simply realized. That is, an area occupied by the RF chip and the part may be reduced.

Also, unlike a case of attaching an external matching component by use of a SAW filter on a Printed Circuit Board (PCB) in the conventional art, according to the present invention, frequency and matching characteristics are influenced by variables such as whether soldering is made, a PCB pattern change, component variation, an attachment position of a component, and an attachment state.

A Q value of resonance may be tunable against Tx frequency change, and the transformer is realized inside the same area, so that the size does not increase and thus there is a little influence on an entire chip area.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A receiving circuit configured to perform a balun circuit function and a notch filter function, the receiving circuit comprising:
   a transformer configured to convert a single input signal into a differential input signal using a first tap, wherein the transformer includes a first winding assembly and a second winding assembly including the first tap and a second tap;
   a notch filter configured to cut a specific frequency band of the single input signal by connecting the second tap with the first tap of the transformer using at least one condenser; and
   a mixer configured to output a signal of a desired frequency by mixing a differential input signal that is output via the first tap of the transformer with a local oscillation frequency.

2. The receiving circuit of claim 1, further comprising a low noise amplifier configured to low-noise amplify a signal received via an antenna and output the amplified signal to an input end of the transformer.

3. The receiving circuit of claim 2, wherein the low noise amplifier comprises a cascode amplifier including a common source single structure.

4. The receiving circuit of claim 1, further comprising a switching part configured to switch a function of the notch filter and compensate a Q value of an inductor.

5. The receiving circuit of claim 4, wherein the switching part comprises two transistors and one current source, the switching part coupled to a third node and a fourth node of the second tap of the transformer.

6. The receiving circuit of claim 1, wherein the notch filter comprises first and second capacitors, the first capacitor coupled between a first node of the first tap and a third node of the second tap, and the second capacitor coupled between a second node of the first tap and a fourth node of the second tap.

7. The receiving circuit of claim 1, wherein a frequency of the notch filter is configured to be tuned by adjusting a variable capacitor coupled between a third node and a fourth node of the second tap of the transformer.

8. The receiving circuit of claim 1, wherein the transformer comprises multiple taps.

9. The receiving circuit of claim 1, wherein the transformer has a physical structure in which a first inductor exists in an outer side, and a second inductor and a third inductor are coiled in an inner side relative to the outer side.

10. The receiving circuit of claim 9, wherein the first inductor, the second inductor, and the third inductor do not overlap one another.

11. A receiving circuit configured to perform a balun circuit function and a notch filter function, the receiving circuit comprising:
   a transformer configured to convert a single input signal into a differential input signal using a first tap, wherein the transformer includes a first winding assembly and a second winding assembly including the first tap and a second tap;

a notch filter configured to cut a specific frequency band of the single input signal by connecting the second tap with the first tap of the transformer using at least one condenser; and a mixer configured to output a signal of a desired frequency by mixing a differential input signal output via the first tap of the transformer with a local oscillation frequency, wherein between a first node, a second node of the first tap, and a third node, a fourth node of the second tap, the notch filter connects the first node with the third node using a first capacitor, and connects the second node with the fourth node using a second capacitor.

12. The receiving circuit of claim 11, further comprising a low noise amplifier configured to low-noise amplify a signal received via an antenna and output the amplified signal to an input end of the transformer.

13. The receiving circuit of claim 12, wherein the low noise amplifier comprises a cascode amplifier including a common source single structure.

14. The receiving circuit of claim 11, further comprising a switching part configured to switch a function of the notch filter and compensate a Q value of an inductor.

15. The receiving circuit of claim 14, wherein the switching part comprises two transistors and one current source, the switching part coupled to the third node and the fourth node of the second tap.

16. The receiving circuit of claim 11, wherein a frequency of the notch filter is configured to be tuned by adjusting a variable capacitor coupled between the third node and the fourth node of the second tap.

17. The receiving circuit of claim 11, wherein the transformer comprises multiple taps.

18. The receiving circuit of claim 11, wherein the transformer has a physical structure in which a first inductor exists in an outer side, and a second inductor and a third inductor are coiled in an inner side relative to the outer side.

19. The receiving circuit of claim 18, wherein the first inductor, the second inductor, and the third inductor do not overlap one another.

* * * * *